United States Patent
Zhu et al.

(10) Patent No.: US 8,089,928 B2
(45) Date of Patent: Jan. 3, 2012

(54) APPARATUS AND METHOD FOR ALLOCATING RESOURCES IN A TRANSPARENT MULTI-HOP RELAY NETWORK

(75) Inventors: Chenxi Zhu, Gaithersburg, MD (US); Hui Zeng, Greenbelt, MD (US); Wei-Peng Chen, Santa Clara, CA (US)

(73) Assignee: Fujitsu Limited, Kawasaki (JP)

( * ) Notice: Subject to any disclaimer, the term of this patent is extended or adjusted under 35 U.S.C. 154(b) by 692 days.

(21) Appl. No.: 12/199,688

(22) Filed: Aug. 27, 2008

(65) Prior Publication Data

US 2010/0054170 A1 Mar. 4, 2010

(51) Int. Cl.
*H04W 4/00* (2009.01)
(52) U.S. Cl. ............. 370/329; 370/230.1; 370/231; 370/232; 370/235; 370/338; 370/341; 370/343; 370/432; 370/437; 455/450; 455/464; 455/509
(58) Field of Classification Search ........... 370/229, 370/230, 230.1, 231, 232, 235, 315, 328, 370/329, 330, 338, 341, 343, 431, 432, 437; 455/450, 464, 509
See application file for complete search history.

(56) References Cited

U.S. PATENT DOCUMENTS

| 7,733,772 | B2 * | 6/2010 | Hazra et al. | 370/230 |
| 2006/0223524 | A1 * | 10/2006 | Ginzburg | 455/424 |
| 2009/0245164 | A1 * | 10/2009 | Lu | 370/315 |
| 2010/0054169 | A1 * | 3/2010 | Zhu et al. | 370/315 |

OTHER PUBLICATIONS

Draft Standard for Local and Metropolitan Area Networks, Part 16: Air Interface for Broadband Wireless Access Systems, P802.16Rev2/DT Oct. 2008, © 2008 IEEE (2080 pages).
IEEE Standard for Local and Metropolitan Area Networks, Part 16: Air Interface for Fixed Broadband Wireless Access Systems, IEEE Std. 802.16™-2004 (Revision of IEEE Std. 802.16-2001 (857 pages), Oct. 1, 2004.
802.16.2™ IEEE Recommended Practice for Local and Metropolitan Area Networks, Coexistence of Fixed Broadband Wireless Access Systems, IEEE Std. 802.16.2™-2004 (Revision of IEEE Std. 802.16. 2-2001 (171 pages), Mar. 17, 2004.

* cited by examiner

*Primary Examiner* — Christopher Grey
(74) *Attorney, Agent, or Firm* — Baker Botts L.L.P.

(57) ABSTRACT

A method for allocating resources in a multi-hop relay network includes establishing one or more relay links, single-hop access links, and multi-hop access links. The method also includes iteratively repeating the following steps until a single-hop data rate is approximately equal to a multi-hop data rate: allocating a first number of slots to the multi-hop access links; dividing the first number of slots among the multi-hop access links; allocating a second number of slots to the relay links; allocating a third number of slots to the single-hop access links; dividing the third number of slots among the single-hop access links; and comparing the single-hop data rate to the multi-hop data rate. The method also includes, upon the single-hop data rate being approximately equal to the multi-hop data rate, provisioning the first number of slots to each of the multi-hop access links, the second number of slots to each of the relay links, and the third number of slots to each of the single-hop access links.

24 Claims, 5 Drawing Sheets

APPARATUS AND METHOD FOR ALLOCATING RESOURCES IN A TRANSPARENT MULTI-HOP RELAY NETWORK

TECHNICAL FIELD OF THE INVENTION

This invention relates in general to communication systems and, more particularly, to an apparatus and method for allocating resources in a transparent multi-hop relay network.

BACKGROUND OF THE INVENTION

While broadband network services and Voice over IP (VoIP) products continue to grow and expand, so does the demand for wireless network functionality. To help meet this demand, networks are being developed that use multiple base stations, relay stations, access points or other points of contact. In many scenarios the various base stations, relay stations, access points or other points of contact communicate with one another via wireless channels. One emerging wireless technology is IEEE 802.16, popularly known as WiMAX. WiMAX provides broadband wireless access, with a single base station providing coverage over a large area (theoretically up to 31 miles). The coverage area of a cell (the area controlled by a particular base station) may be enhanced through the use of relay stations. Other wireless networking technologies include Third Generation (3G), Third Generation Partnership Project (3GPP), and IEEE 802.11, popularly known as WiFi.

SUMMARY

In accordance with a particular embodiment, a method for allocating resources in a multi-hop relay network includes establishing one or more relay links, one or more single-hop access links, and one or more multi-hop access links. The method also includes steps that are iteratively repeated until a single-hop data rate is approximately equal to a multi-hop data rate. The iterative steps include allocating a first number of slots to the multi-hop access links and dividing the first number of slots among the multi-hop access links ensuring each multi-hop access link comprises an approximately equal multi-hop data rate. The iterative steps also include allocating a second number of slots to the relay links ensuring that each relay link comprises a relay link data rate that is approximately equal to a collective multi-hop data rate for the respective multi-hop access links established therebetween. The iterative steps further include allocating a third number of slots to the single-hop access links and dividing the third number of slots among the single-hop access links ensuring each single-hop access link comprises an approximately equal single-hop data rate. The iterative steps additionally include comparing the single-hop data rate to the multi-hop data rate. The method also includes, upon the single-hop data rate being approximately equal to the multi-hop data rate, provisioning the first number of slots to each of the multi-hop access links, the second number of slots to each of the relay links, and the third number of slots to each of the single-hop access links.

Technical advantages of particular embodiments may include a more efficient utilization of wireless resources in a multi-hop relay network. Accordingly, a multi-hop relay network may be able to accommodate a greater number of endpoints or provide the same number of endpoints with greater resources as compared to traditional multi-hop relay networks.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Figure 1:
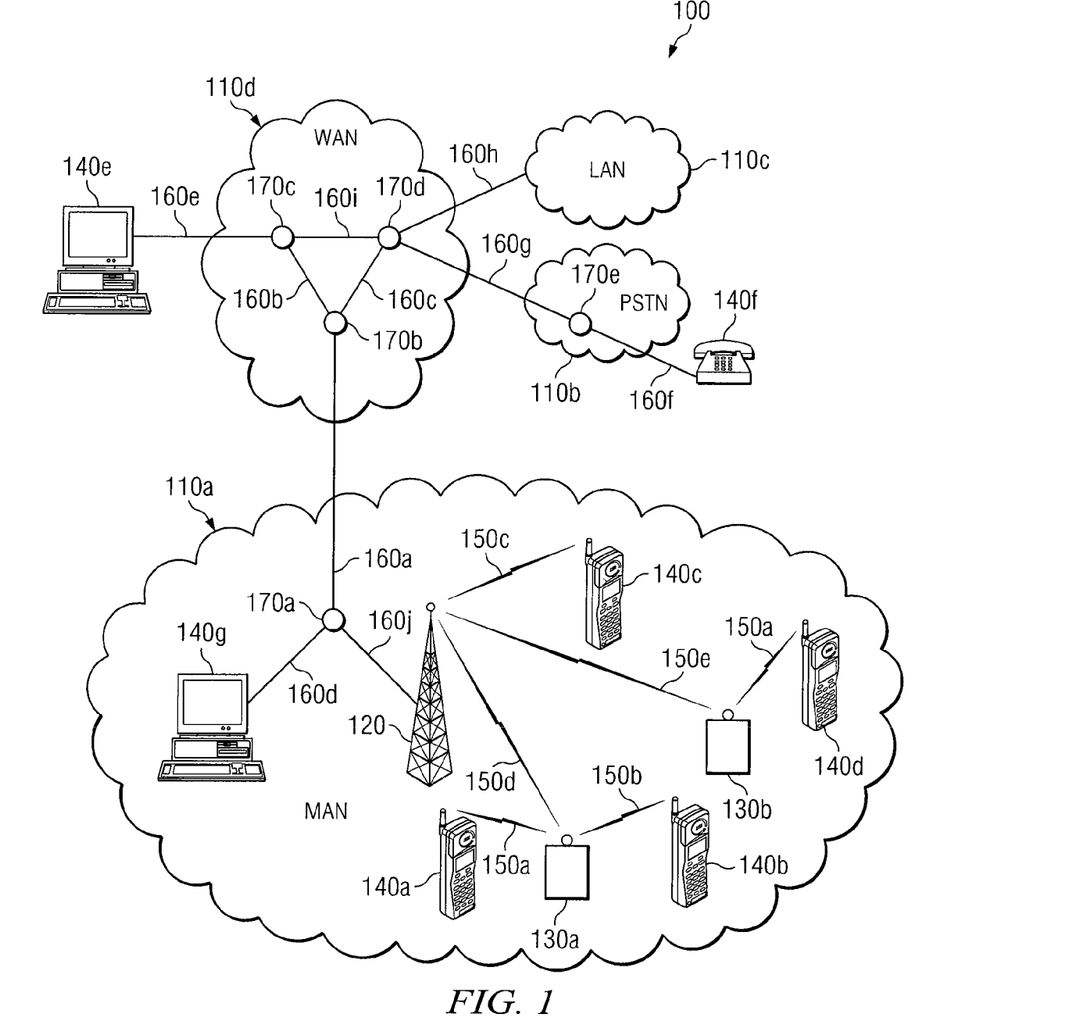
FIG. 1 illustrates a communication system comprising various communication networks, in accordance with a particular embodiment.

FIG. 1 illustrates a communication system comprising various communication networks, in accordance with a particular embodiment. Communication system 100 may be comprised of multiple networks 110. Each network 110 may be any of a variety of communication networks designed to facilitate one or more different services either independently or in conjunction with other networks. For example, networks 110 may facilitate internet access, online gaming, file sharing, peer-to-peer file sharing (P2P), voice over internet protocol (VoIP) calls, video over IP calls, or any other type of functionality typically provided by a network. Networks 110 may provide their respective services using any of a variety of protocols for either wired or wireless communication. For example, network 110a may comprise an 802.16 wireless network, popularly known as WiMAX, which may include base stations (e.g., base station 120) and relay stations (e.g., relay stations 130). Network 110a may provide for the use of relay stations 130 by implementing 802.16j. A WiMAX network that uses relay stations may be referred to as a mobile multihop relay (MMR) network.

In particular embodiments, one or more endpoints may have established a wireless connection with a relay station (access link). Accordingly, the relay station may need to ensure that there are sufficient wireless resources available for a wireless connection (relay link) between itself and a base station to maintain each of the wireless connections with the endpoints. For example, if endpoints 140a and 140b are both connected to relay station 130a then it may be desirable for wireless connection 150d to comprise sufficient resources to support both wireless connections 150a and 150b evenly (e.g., both endpoints 140a and 140b have the same data rate). This may be referred to as a rate fair setup (where all the endpoints serviced by a particular base station, either directly or indirectly, receive a similar data rate). While the endpoints may be receiving a similar data rate they may be consuming different quantities of wireless resources based on the efficiency and/or protocol that the endpoint uses. Thus, the wireless resources used by wireless connection 150d may correspond to the total amount of wireless resources used for endpoints 140*a* and 140*b*. This in turn impacts the amount of resources available to base station 120 for communicating with endpoints connected directly thereto (e.g., endpoint 140*c*). In some embodiments, the amount of wireless resources available to a particular component may be measured by the number of slots within a communication frame as discussed in more detail below. Particular embodiments may take into account the balance of wireless resources between relay links and access links when determining how wireless resources should be distributed.

Between each relay station and/or base station there may be a wireless connection, such as wireless connection 150*d*. As mentioned above, this wireless connection may be referred to as a relay link. A wireless connection may comprise various wireless resources such as, for example, a combination of a particular center frequency, a particular bandwidth, a particular time slot, and/or a particular subchannel (for example, as described in a downlink or uplink MAP). In particular embodiments, it may be convenient to discuss the amount of resources in terms of slots. Depending on the embodiment, a slot may comprise a particular number of subchannels and symbols (also known as time slots). For example, Section 8.4.3.1 in the Institute of Electrical & Electronics Engineers (IEEE) 802.16e-2005 Standard specifies a slot comprising a single subchannel and two symbols.

An increase in the number of wireless connections 150 may increase the impact and severity of interference between wireless connections 150. In particular embodiments, uplink sounding may be used to estimate the channel gain and interference strength between multiple relay stations 130 and base station 150. The uplink sounding may, therefore, be used in determining the quality and/or efficiency of the various wireless connections.

Although communication system 100 includes four different types of networks, networks 110*a*-110*d*, the term "network" should be interpreted as generally defining any network or combination of networks capable of transmitting signals, data, and/or messages, including signals, data or messages transmitted through WebPages, e-mail, text chat, voice over IP (VoIP), and instant messaging. Depending on the scope, size and/or configuration of the network, any one of networks 110*a*-110*d* may be implemented as a LAN, WAN, MAN, PSTN, WiMAX network, global distributed network such as the Internet, Intranet, Extranet, or any other form of wireless or wired networking.

Generally, networks 110*a*, 110*c*, and 110*d* provide for the communication of packets, cells, frames, or other portions of information (generally referred to as packets herein) between endpoints 140 and/or nodes 170. Networks 110 may include any number and combination of wired links 160, wireless connections 150, nodes 170 and/or endpoints 140. For purposes of illustration and simplicity, network 110*a* is a MAN that may be implemented, at least in part, via WiMAX, network 110*b* is a PSTN, network 110*c* is a LAN, and network 110*d* is a WAN.

In particular embodiments, networks 110*a*, 110*c* and 110*d* may be IP networks. IP networks transmit data by placing the data in packets and sending each packet individually to the selected destination, along one or more communication paths. Network 110*b* may, for example, be a PSTN that may include switching stations, central offices, mobile telephone switching offices, pager switching offices, remote terminals, and other related telecommunications equipment that are located throughout the world. Network 110*d* may be coupled to network 110*b* through a gateway. Depending on the embodiment, the gateway may be a part of network 110*b* or 110*d* (e.g., nodes 170*e* or 170*c* may comprise a gateway). The gateway may allow PSTN 110*d* to be able to communicate with non-PSTN networks such as networks 110*a*, 110*c* and 110*d*.

Any of networks 110*a*, 110*c* or 110*d* may be coupled to other IP networks including, but not limited to, the Internet. Because IP networks share a common method of transmitting data, signals may be transmitted between devices located on different, but interconnected, IP networks. In addition to being coupled to other IP networks, any of networks 110*a*, 110*c* or 110*d* may also be coupled to non-IP networks through the use of interfaces or components such as gateways.

Networks 110 may be connected to each other and with other networks via a plurality of wired links 160, wireless connections 150, and nodes 170. Not only do the wired links 160, wireless connections 150, and nodes 170 connect various networks but they also interconnect endpoints 140 with one another and with any other components coupled to or a part of any of networks 110. The interconnection of networks 110*a*-110*d* may enable endpoints 140 to communicate data and control signaling between each other as well as allowing any intermediary components or devices to communicate data and control signals. Accordingly, users of endpoints 140, may be able to send and receive data and control signals between and among each network component coupled to one or more of networks 110*a*-110*d*.

As noted above, wireless connections 150 may represent a wireless link between two components using, for example, WiMAX. The extended range of a WiMAX base station and/or relay station may allow network 110*a* to cover the larger geographic area associated with a MAN while using a relatively small number of wired links. More specifically, by properly arranging base station 120 and multiple relay stations 130 around a metropolitan area, the multiple relay stations 130 may use wireless connections 150 to communicate with base station 120 and wireless endpoints 140 throughout the metropolitan area. Then base station 120 may, through wired connection 160*a*, communicate with other base stations, network components not capable of establishing a wireless connection, and/or other networks outside of the MAN, such as network 110*d* or the Internet.

Nodes 170 may include any combination of network components, session border controllers, gatekeepers, base stations, conference bridges, routers, hubs, switches, gateways, endpoints, or any other hardware, software, or embedded logic implementing any number of communication protocols that allow for the exchange of packets in communication system 100. For example, node 170*a* may comprise another base station that is wired to base station 120 via link 160*j* and to network 110*d* via link 160*a*. As a base station, node 170*a* may be able to establish several wireless connections with various other base stations, relay stations, and/or endpoints. As another example, node 170*e* may comprise a gateway. This may allow network 110*b*, a PSTN network, to be able to transmit and receive communications from other non-PSTN networks, such as network 110*d*, an IP network. Node 170*e*, as a gateway, works to translate communications between the various protocols used by different networks.

Endpoints 140 and/or nodes 170 may provide data or network services to a user through any combination of hardware, software embedded in a computer readable medium, and/or encoded logic incorporated in hardware or otherwise stored (e.g., firmware). For example, endpoints 140*a*-140*d* may include an IP telephone, a computer, a video monitor, a camera, a personal data assistant, a cell phone or any other hardware, software and/or encoded logic that supports the communication of packets (or frames) using networks 110. Endpoints 140 may also include unattended or automated systems, gateways, other intermediate components or other devices that can send or receive data and/or signals. Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
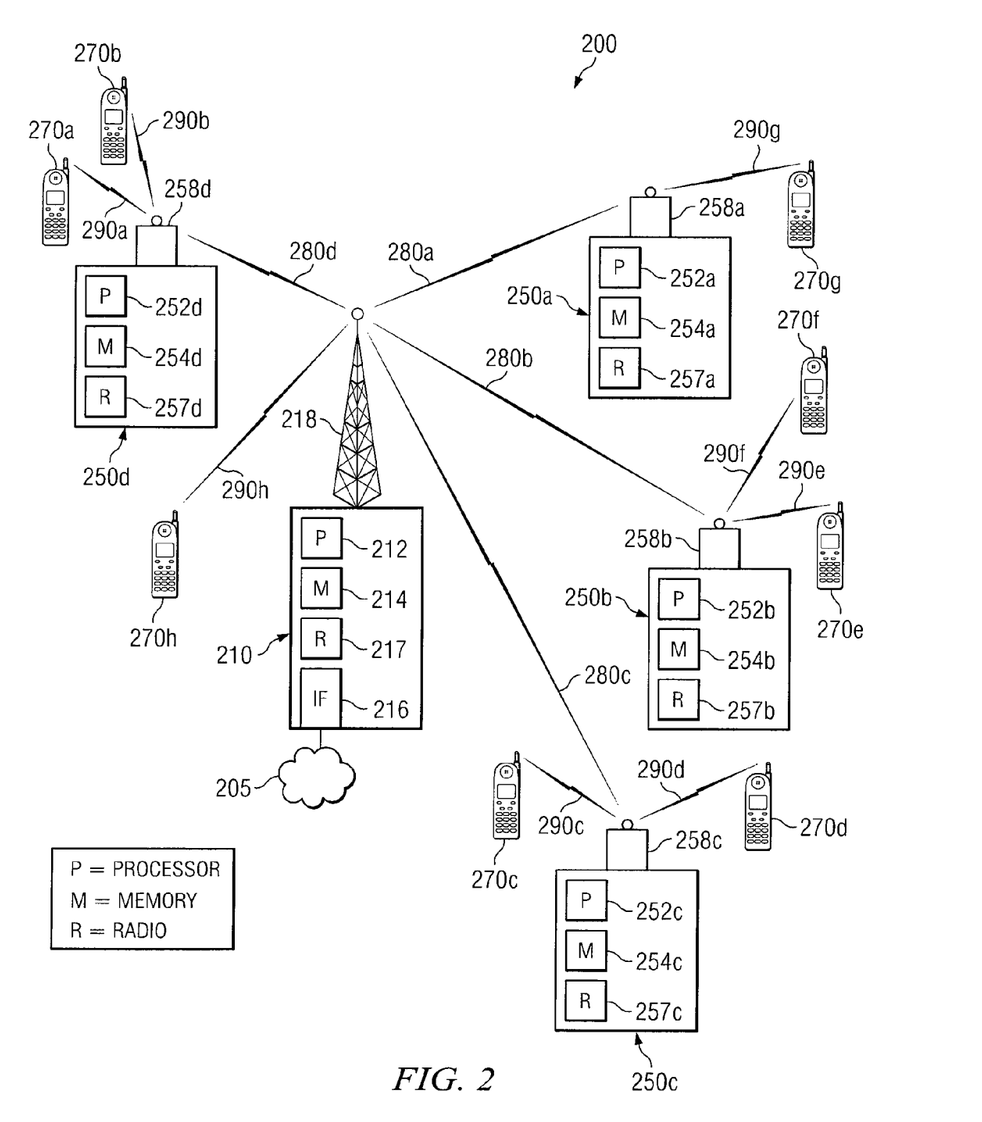
FIG. 2 illustrates a wireless network comprising a more detailed view of a base station and several relay stations, in accordance with a particular embodiment.

FIG. 2 illustrates a wireless network comprising a more detailed view of base station 210 and relay stations 250, in accordance with a particular embodiment. In different embodiments the network may comprise any number of wired or wireless networks, base stations, endpoints, relay stations, and/or any other components that may facilitate or participate in the communication of data and/or signals whether via wired or wireless connections. For simplicity, wireless network 200 of the depicted embodiment comprises wired network 205, base station 210, endpoints 270 and relay stations 250. Base station 210 comprises processor 212, memory 214, interface 216, radio 217 and antenna 218. Similarly, relay stations 250 comprise processors 252, memory modules 254, radios 257 and antennas 258. These components may work together in order to provide base station and/or relay station functionality, such as providing wireless connections in a wireless network (e.g., a WiMAX wireless network). Network 205 may comprise one or more of the networks described above with respect to FIG. 1. For example, network 205 may comprise the Internet, a LAN, WAN, MAN, PSTN or some combination of the above.

Processor 212 may be a microprocessor, controller, or any other suitable computing device, resource, or combination of hardware, software and/or encoded logic operable to provide, either alone or in conjunction with other base station 210 components, such as memory 214, base station 210 functionality. Such functionality may include providing various wireless features discussed herein to an endpoint or relay station, such as endpoint 270h or relay station 250a. For example, processor 212 may determine how to distribute wireless resources among the access links and relay links used by endpoints 270 and relay stations 250. The distribution of wireless resources may be such that a rate fair scheme may be implemented. In determining the distribution of wireless resources, processor 212 may take into account the number of relay links and access links that are needed as well as the efficiency with which those links are able to transmit/receive data. Furthermore, as the number and type of endpoints change, processor 212 may be able to adjust the allocation of wireless resources on a frame-by-frame basis.

Memory 214 may be any form of volatile or non-volatile memory including, without limitation, magnetic media, optical media, random access memory (RAM), read-only memory (ROM), flash memory, removable media, or any other suitable local or remote memory component or components. Memory 214 may store any suitable data or information utilized by base station 210, including software embedded in a computer readable medium, and/or encoded logic incorporated in hardware or otherwise stored (e.g., firmware). In some embodiments memory 214 may store information used by processor 212 in determining how to divide wireless resources between access links and relay links. Memory 214 may also store the results and/or intermediate results of the various calculations and determinations performed by processor 212. Memory 214 may also store information regarding the quality of particular links. This quality may be an indication of how efficient a particular link is at transferring data. Memory 214 may also maintain a list, database, or other organization of data useful for determining how to route data to the proper endpoints and/or relay stations. For example, in some embodiments a tree structure (as opposed to a mesh structure) may be used in routing data from an endpoint to a base station. More specifically, there may be a known path from base station 210 to endpoint 270b. This path, or a portion thereof, may be stored in memory 214.

Base station 210 also comprises interface 216 which may be used for the wired communication of signaling and/or data between base station 210 and network 205. For example, interface 216 may perform any formatting or translating that may be needed to allow base station 210 to send and receive data from network 205 over a wired connection. Interface 216 may also be used to establish any wired connections between base station 210 and other networks or network components.

Radio 217 may be coupled to or a part of antenna 218. Radio 217 may receive digital data that is to be sent out to other base stations, relay stations and/or endpoints via a wireless connection. The wireless connection may use the wireless resources assigned to base station 210. The wireless resource may include, for example, a combination of one or more of a center frequency, bandwidth, time slot, channel, and/or subchannel. In particular embodiments this information may be stored in memory module 214. Radio 217 may convert the digital data into a radio signal having the appropriate center frequency and bandwidth parameters. These parameters may have been determined ahead of time by some combination of processor 212 and memory 214. The radio signal may then be transmitted via antenna 218 for receipt by any appropriate components or devices (e.g., relay station 250d). Similarly, radio 217 may convert radio signals received from antenna 218 into digital data to be processed by processor 212.

Antenna 218 may be any type of antenna capable of transmitting and receiving data and/or signals wirelessly. In some embodiments, antenna 218 may comprise one or more omnidirectional, sector or panel antennas operable to transmit/receive radio signals between 2 GHz and 66 GHz. An omnidirectional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. Together, radio 217 and antenna 218 may form a wireless interface. This wireless interface may be used to establish connections with various wireless components, including endpoints and relay stations.

Relay stations 250 may, in essence, be smart repeaters between base station 210 and endpoints 270. Depending on the embodiment and configuration of a relay station, one or more of relay stations 250 may be transparent or non-transparent. From the perspective of an endpoint, a transparent relay station is perceived as though the endpoint were communicating with base station 210 while a non-transparent relay station is perceived as though it were another base station. More specifically, a transparent relay station may not transmit related control information (e.g. a preamble or a downlink/uplink MAP) whereas a non-transparent relay station may transmit this information.

Relay stations 250 may comprise components similar to those of base station 210. One exception for relay stations 250 is that relay stations 250 may not include an interface for a wired connection. This may be because relay stations 250 may communicate with base station 210 and other relay stations 250 via wireless connections. Thus, relay stations 250 may not need a wired connection. By allowing relay stations 250 to be deployed without a wired connection, the initial deployment cost may be lower because network wires do not have to be run out to each relay station 250. In particular embodiments, a relay station may include an interface for a wired connection. Relay stations 250a, 250b, 250c, and 250d may comprise similar components that may provide similar functionality. Therefore, for simplicity, the following discussion of the relay station components depicted in FIG. 2 may refer to the component in general and may be applied to each relay station.

Like base station 210, relay station 250 comprises a processor. Processor 252 may be a microprocessor, controller, or any other suitable computing device, resource, or combination of hardware, software and/or encoded logic operable to provide, either alone or in combination with other relay station 250 components, such as memory module 254, relay station 250 functionality. Such functionality may include providing various wireless features discussed herein to an endpoint or base station, such as endpoints 270a-270b or base station 210. In particular embodiments, processor 252 may determine the quality of one or more wireless connections or links. This information may be provided to base station 218.

Like memory 214, memory module 254 may be any form of volatile or non-volatile memory including, without limitation, magnetic media, optical media, random access memory (RAM), read-only memory (ROM), flash memory, removable media, or any other suitable local or remote memory component or components. Memory module 254 may store any suitable data or information, including software embedded in a computer readable medium, and/or encoded logic incorporated in hardware or otherwise stored (e.g., firmware) utilized by relay station 250. In some embodiments, memory module 254 may store information indicative of the size, features and number of slots that may be needed or used for each wireless connection. Memory module 254 may additionally maintain a list, database, or other organization of data useful for determining how to route data to the proper endpoints, base stations and/or relay stations.

Radio 257 may be coupled to or a part of antenna 258. Radio 257 may receive digital data from, for example, processor 252 that is to be sent out to other base stations, relay stations and/or endpoints via a wireless connection. The wireless connection may use the wireless resources assigned to relay station 250. The wireless resource may include, for example, a combination of one or more of a center frequency, bandwidth, time slot, channel, and/or subchannel. In particular embodiments this information may be stored in memory module 254. Radio 257 may convert the digital data into a radio signal having the appropriate center frequency and bandwidth parameters. These parameters may have been determined ahead of time by base station 210 or processor 252. The radio signal from radio 257 may then be transmitted via antenna 258 to the appropriate recipient (e.g., base station 210) at the appropriate time. Radio 257 may also convert radio signals received by antenna 258 into digital data to be processed by processor 252.

Antenna 258 may be any type of antenna capable of transmitting and receiving data and/or signals wirelessly. In some embodiments, antenna 258 may comprise one or more omnidirectional, sector or panel antennas operable to transmit/receive radio signals between 2 GHz and 66 GHz. Antenna 258 and radio 257 may collectively be referred to as a wireless interface, or simply an interface. This wireless interface may be used to establish connections with various wireless components, including endpoints and base stations.

Endpoints 270 may be any type of wireless endpoints able to send and receive data and/or signals to and from base station 210 or relay stations 250. Some possible types of endpoints 270 may include desktop computers, PDAs, cell phones, laptops, and/or VoIP phones.

In particular embodiments, wireless network 200 may be provisioned so that each endpoint 270 receives the same data rate. This may be referred to as rate fair. While each endpoint 270 may receive approximately the same data rate, the amount of resources that may be used may vary. For example, a particular endpoint that is using a less efficient wireless communication protocol or is in an area with poor signal strength may consume more wireless resources to achieve the same data rate as a more efficient endpoint. Furthermore, as may be apparent, in order to maintain the data rates for the access links (e.g., between endpoints 270a and 270b and relay station 250d), the relay link (e.g., between relay station 250d and base station 210) needs to support matching data rates. The more wireless resources (e.g., slots) used by base station 210 for relay links, the fewer wireless resources it will have available for its own access links (e.g., between endpoint 270h and base station 210).

Processor 212, for example, may take these competing factors into account when determining the data rate for endpoints 270 and how to allocate wireless resources. This may best be seen by the following example in which relay stations 250 are transparent relay stations. In this example it may be assumed that data is communicated using frames as depicted in FIGS. 3A-3B and discussed below.

Figure 3A:
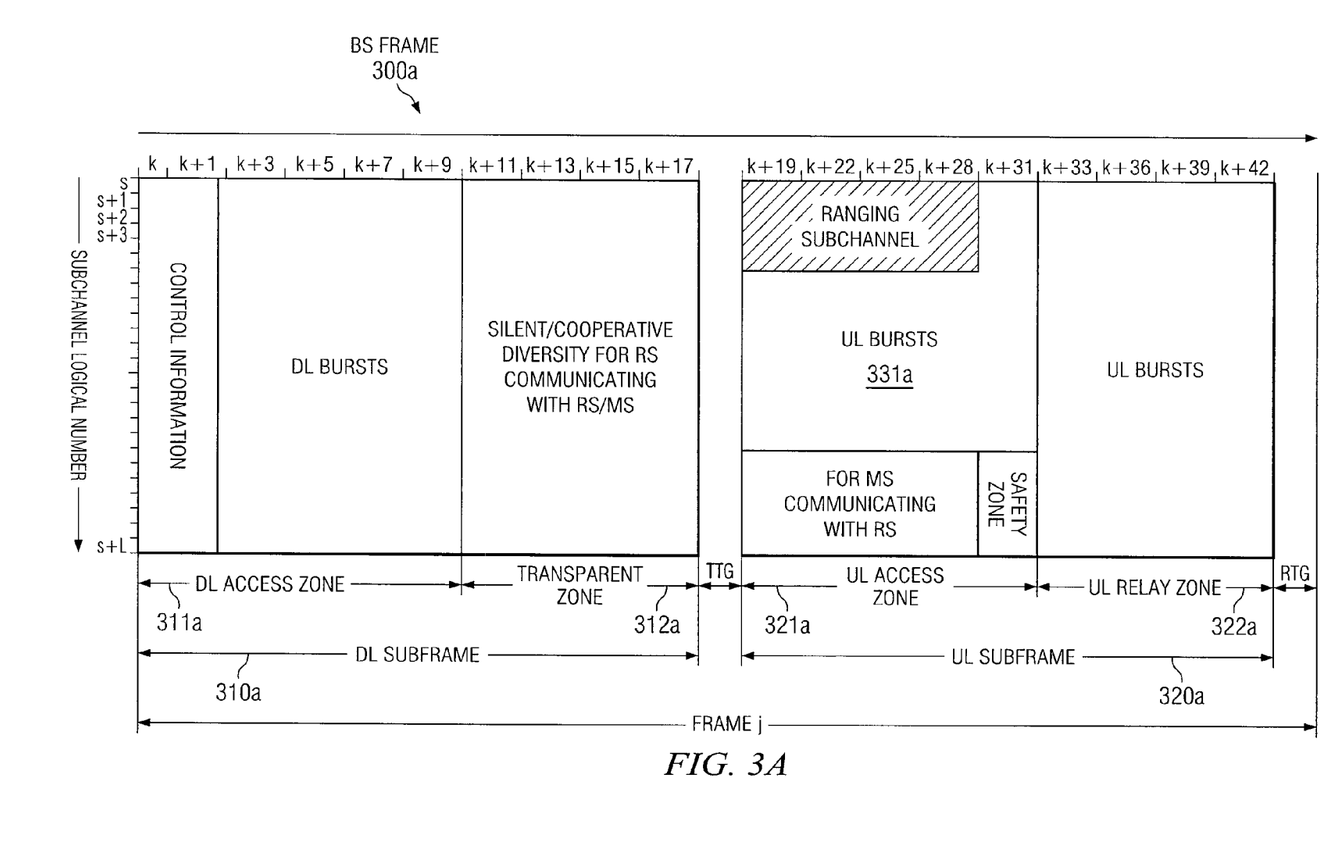
FIGS. 3A and 3B illustrate block diagrams of the frame structure of a base station frame and a relay station frame, respectively, for use with a transparent relay station, in accordance with particular embodiments.
Figure 3B:
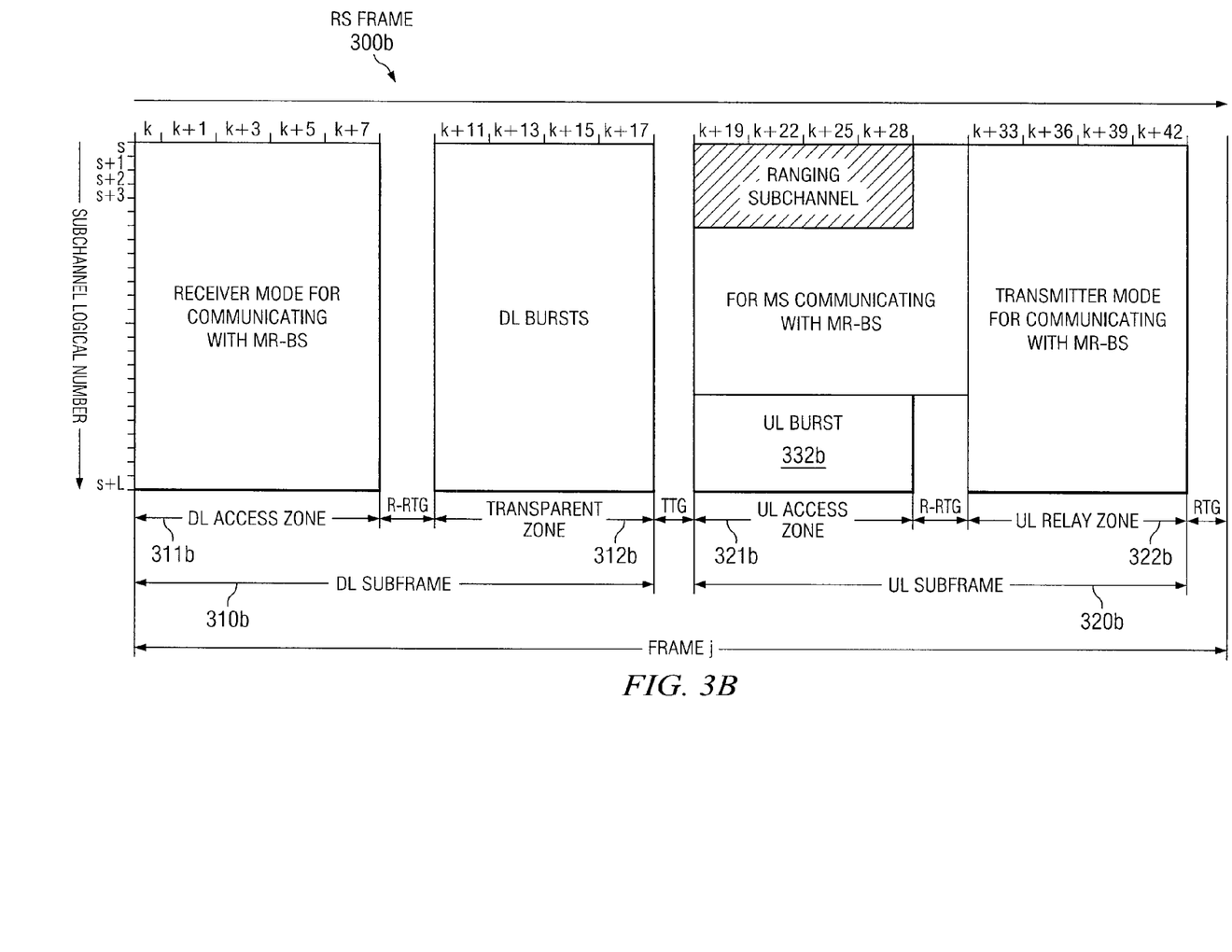

FIGS. 3A and 3B illustrate block diagrams of the frame structure of a base station frame and a relay station frame, respectively, for use with a transparent relay station, in accordance with particular embodiments. Frames 300 comprise a fixed number of slots (a slot may comprise a specific time/duration and channel). The actual number of slots may depend on the size of a slot and the size of frame 300. In particular embodiments, the protocol used by network 200 may specify the size of a slot and frame. For example, in some embodiments frames 300 may comprise four-hundred and fifty slots. Frames 300 may be broken down into two different sub-frames, downlink sub-frame 310 and uplink sub-frame 320. The sub-frames may further be broken down into different zones. Downlink sub-frame 310 may comprise a downlink access zone 311 and a transparent zone 312. Similarly uplink sub-frame 320 may comprise uplink access zone 321 and uplink relay zone 322. The size of these zones may be based on the number of slots used by a particular set of links. For example, the size of transparent zone 312 may be based on the number of slots used by access links 290a-290g of FIG. 2. Thus while a frame may be of a fixed size (e.g., duration and channel), the zones within a frame may vary based on the number of slots assigned to, for example, the relay links assigned to the relay stations.

Within downlink sub-frame 310, downlink access zone 311a may be used by a base station (e.g., base station 210) to transmit data to any endpoints (e.g., endpoint 270h) and/or relay stations (e.g., relay stations 250) connected thereto. This includes control information such as a preamble and downlink and uplink MAPs. Accordingly, downlink access zone 311b may be used by the relay stations to receive data from the base station. The base station may then be silent during transparent zone 312, while the relay stations may be transmitting data to any endpoints (e.g., endpoints 270a-270g) connected thereto.

Within uplink sub-frame 320, uplink access zone 321a may be used by the base station to receive data from any endpoints connected thereto. Similarly, the relay stations may use uplink access zone 321b to receive data from any of the endpoints connected thereto. Uplink relay zone 322a may then be used by the base station to receive data from any relay stations connected thereto. Accordingly uplink relay zone 322b may be used by the relay stations 250 to transmit data to the base station.

In particular embodiments in which transparent relay stations are used there may not be any overlap in wireless resources. More specifically, the frequency and time slot used by a base station or relay station may not be used by any other base station or relay station. For example, within access zone 321 the endpoints connected to the base station may upload their data during uplink burst 331a; however the base station may not receive any data while a relay station is receiving data from its endpoints during uplink bursts 332b.

Returning to FIG. 2, it may be assumed, for purposes of this first example, that wireless network 200 includes transparent relay stations 250. Accordingly, wireless network 200 may use the frame structure discussed above with respect to FIGS. 3A and 3B. In order to determine the data rate each endpoint 270 is to receive, and thus what size each zone of the frame needs to be, processor 212 may first need to receive certain information. This information may include the number of relay stations and endpoints that are connected, both directly and indirectly (e.g., via one of relay stations 250), to base station 210 as well as the quality of each link between each component. All, some, or none of this information may automatically be provided to base station 210 as part of the wireless protocol used by wireless network 200. The link quality information may be used to determine the efficiency with which data is communicated over a particular link. In some embodiments processor 252c of relay station 250c, for example, may aggregate and/or average the link quality of all its access links (e.g., the links used by endpoints 270c and 270d). Base station 210 may receive this information via antennae 218 and radio 217 and store it in memory 214.

Processor 212 may then tentatively assign a certain number of slots to be used for access links 290a-290g between relay stations 250 and endpoints 270a-270g. This may effect the size of the uplink access zone and the transparent zone (see FIGS. 3A and 3B). Using the link quality information stored in memory 214 for each of access links 290a-290g, along with the total number of slots available for use by access links 290a-290g, processor 212 may be able to determine how the slots should be divided so that the data rate given to each of endpoints 270a-270g is approximately equal. Then, using the link quality information stored in memory 214 for each of relay links 280, along with the cumulative data rate given to endpoints 270a-270g, processor 212 may be able to determine how many slots are needed for relay links 280. More specifically, because it may be desirable to match the data rate from an endpoint to a relay station with the data rate from the relay station to a base station, the desired data rate between the relay station and the base station should be approximately equal to the total data rate provided to all of the endpoints connected to the relay station. This may allow the relay station to provide a more consistent user experience.

From the number of slots used for relay links 280 and access links 290a-290g, processor 212 may be able to determine the number of slots available for access links for endpoints connected directly to base station 210 (e.g., access link 290h for endpoint 270h). More specifically, because there is a finite number of slots within any given frame, the number of slots available for access link 290h is approximately equal to the total number of slots minus the number of slots used by relay links 280 and access links 290a-290g. Thus, as the number of slots used by access links 290a-290g increase so to do the number of slots used for relay links 280, and thus the number of slots available for access link 290 decreases. This can be seen in frame 300 where if transparent zone 312b increases so to must transparent zone 312a which decrease the size of downlink access zone 311a.

Then, based on the quality/efficiency of access link 290h, stored in memory 214, and the number of slots assigned to access link 290h processor 212 may be able to determine the data rate of access link 290h. Processor 212 then has enough information to determine whether all the access links 290 are providing their respective endpoints 270 with a similar or different data rate. More specifically, processor 212 may be able to compare the data rate of endpoint 270h with the data rate for any of endpoints 270a-270g. If the data rates are not similar, processor 212 may adjust the number of slots that were previously tentatively assigned for use by access links 290a-290g and repeat the above described determinations. For example, in particular embodiments processor 212 may increase or decrease the number of slots that were tentatively assigned to be used for access links 290a-290g in 5 slot increments. Then it may repeat the above determinations and calculations so as to compare the resulting data rate of access links 290. This may be repeated until processor 212 has determined that each endpoint 270 will receive a similar data rate.

In particular embodiments, one or more relay stations 250 may communicate with base station 210 via another relay station 250. In other words, it may be that two or more relay stations are cascaded such that a communication from an endpoint connected to a relay station at the end of the cascade may pass through, and be relayed by, another relay station before it reaches base station 210. Besides relaying communications from another relay station, the intermediary relay station may also have endpoints connected thereto. Thus, as may be apparent, the relay link for the intermediary relay station may need sufficient bandwidth to cover the endpoints connected thereto, as well as the endpoints connected to the relay station at the end of the cascade. An arrangement of cascaded relay stations may easily be envisioned if it were assumed that relay link 280b went from relay station 250b to relay station 250c (instead of to base station 210). Particular embodiments may account for the cascading relay stations by each of the relay stations (beginning with the relay station furthest from the base station) adjusting the zone size assigned to itself and the frame size assigned to its children relay stations from next hop to the end of the cascade so that every endpoint connected to any of these relay stations gets equal throughput on the relay link.

Figure 4:
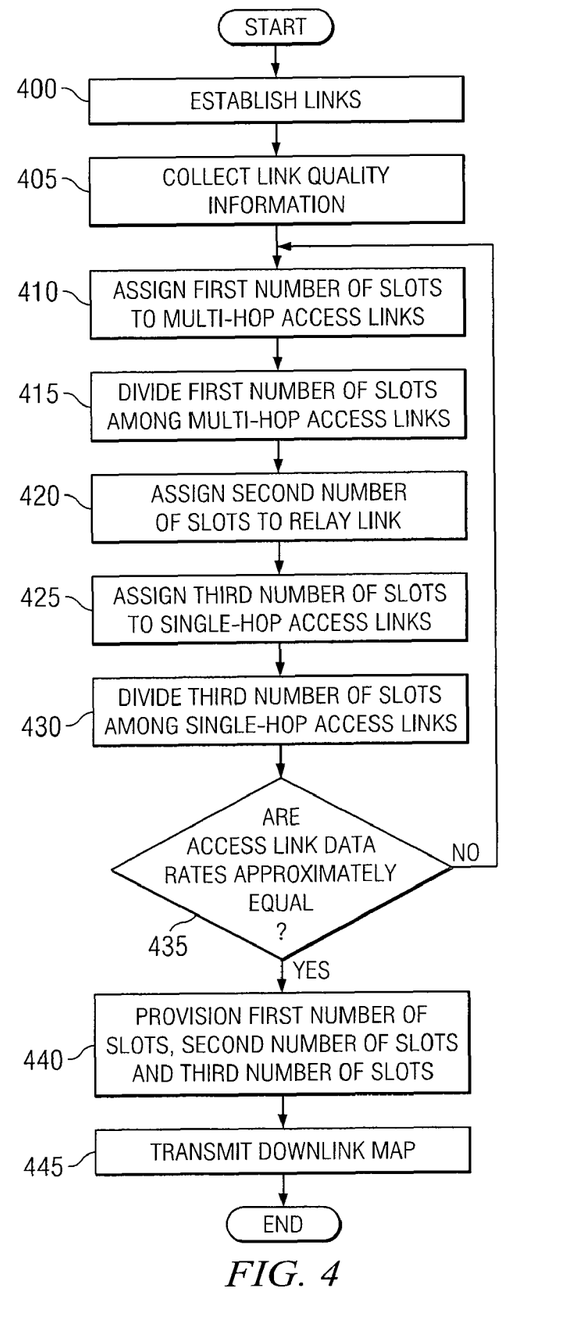
FIG. 4 illustrates a method for allocating resources in a transparent multi-hop relay network, in accordance with a particular embodiment.

FIG. 4 illustrates a method for allocating resources in a transparent multi-hop relay network, in accordance with a particular embodiment. The method begins at step 400 with the establishment of links. This may include establishing one or more relay links between the base station and one or more relay stations, one or more single-hop access links between the base station and one or more endpoints, and one or more multi-hop access links between the relay stations and one or more endpoints (different than the endpoints linked to the base station). For convenience, the endpoints linked to the base station may be referred to as single-hop endpoints and the endpoints linked to the relay stations may be referred to as multi-hop endpoints.

At step 405 link quality information is collected. The link quality information may be collected for any of the single-hop access links, multi-hop access links and/or relay links. The link quality information received at step 405 may be indicative of the efficiency with which a link may be able to communicate data. This efficiency may be affected by such factors as the distance between the endpoint and the relay station or base station, the signal strength, and/or the protocol being used. In some embodiments, the link quality of a particular set of links, such as a set of multi-hop access links between a set of endpoints and a relay station, may be aggregated, averaged, or otherwise summarized.

At step 410 a first number of slots are assigned to the multi-hop access links. The multi-hop access links may be a subset of the total number of access links serviced by a particular base station. The subset of multi-hop access links may further comprise additional subsets. For example, in some instances in which there are multiple relay stations, the multi-hop access links may comprise different subsets of multi-hop access links for each of the multiple relay stations. The first number of slots assigned at step 410 may be based on the number of slots that were previously assigned to the multi-hop access links. More specifically, in instances where step 410 is being executed for the first time for a particular frame, the first number of slots may be based on the number of slots that were assigned to the first set of access links in a previous frame. In instances where step 410 is being executed for the second time for the same frame, the first number of slots may be based on the number of slots that were initially assigned at step 410 during a previous iteration. This initial assignment may be incremented up or down depending on the results of the comparison at step 435.

At step 415 the first number of slots are divided among the multi-hop access links. In doing so, particular embodiments may ensure that the slots are divided such that each of the multi-hop access links is able to provide an approximately equal data rate. In particular embodiments the data rate may be determined by taking into account the link quality information collected at step 405 associated with each multi-hop access link. Accordingly, even though each multi-hop access link may be able to provide approximately equal data rates, the number of slots may not necessarily be divided evenly among the multi-hop access links.

At step 420 a second number of slots are assigned to the relay link. The number of slots assigned to the relay link may be determined such that the data rate provided by the relay link is approximately equal to the collective data rate of the multi-hop access links connected thereto. For example, if a relay station has three multi-hop access links connected thereto, then the number of slots assigned to the relay link would be sufficient to provide a data rate that is approximately equal to the collective data rate of the three multi-hop access links. This may help to ensure quality of service levels for the endpoints by ensuring that there are sufficient resources available for the relay link to match the cumulative data rate of each multi-hop access link. As with the multi-hop access links, the number of slots needed may be based in part on the link quality information received at step 405. For example, in particular embodiments, based on the link quality information for the relay link it may be possible to determine the number of slots needed to achieve a data rate that matches the cumulative data rate of the multi-hop access links connected thereto. As may be apparent, different relay links may require a different number of slots.

As alluded to above, in particular embodiments, the cumulative data rate may be determined before the second number of slots are assigned to the relay links so that the data rates may be approximately equal. The cumulative data rate may be based on the individual data rate for each of the multi-hop access links. More specifically, the data rate of each multi-hop access link associated with a particular relay station may be summed. The relay link data rate for that particular relay station would then need to be approximately equal to the resulting cumulative multi-hop data rate. This is repeated for each relay station. As with the multi-hop data rate, the relay link data rate may be determined using a variety of techniques. For example, in particular embodiments the relay link data rate may be based on the number of slots that are assigned as well as the link quality information associated with the relay link.

At step 425 a third number of slots are assigned to the single-hop access links. The single-hop access links may represent those access links that are connected directly to the base station. Thus, they may be a subset of the access links serviced by the base station. In particular embodiments, the third number of slots may be determined based on the first number of slots assigned to the multi-hop access links, the second number of slots assigned to the relay links and the total number of slots available. More specifically, the protocol being used by the network may define a frame structure having a fixed number of slots. From this fixed number of slots the first number of slots assigned to the multi-hop access links as well as the second number of slots assigned to the relay links are already in use and thus can not be reused for the third number of slots. Accordingly, the third number of slots may comprise the total number of slots minus the first number of slots and the second number of slots.

At step 430 the third number of slots are divided among the single-hop access links. As with the multi-hop access links, the third number of slots are divided among the single-hop access links to ensure that each link is able to provide an approximately equal data rate. This may comprise utilizing both the link quality information for the single-hop access links as well as the number of slots assigned to each single-hop access links.

At decisional step 435 the single-hop and multi-hop access link data rates are compared. In other words, the data rate provided to a multi-hop endpoint is compared to the data rate provided to a single-hop endpoint to determine if they are both receiving similar data rates. If the access link data rates are approximately equal then the method continues to step 445. This indicates that a rate fair environment has been achieved. More specifically, at step 415 the multi-hop access links were all given approximately equal data rates, at step 430 the single-hop access links were all given approximately equal data rates, and at step 435 it was determined that these two data rates were themselves approximately equal. If the access link data rates are not equal the method returns to step 410. Steps 410 through 435 are then repeated. At step 410 the first number of slots that is assigned to the multi-hop access links may be incremented or decremented by a certain amount. Depending on the embodiment the amount that the first number of slots assigned to the first set of access links is incremented/decremented may be a fixed amount, or it may be determined based on the difference between the first and second access link data rates.

At step 440 the first number of slots, the second number of slots and the third number of slots are provisioned. This provisioning may affect the size of the different zones within a particular frame. Each frame may have different sized zones because the method may allow for frame-by-frame adjustments.

At step 445 a downlink MAP is transmitted. The downlink MAP may comprise information indicative of the provisioning of the first number of slots, the second number of slots and the third number of slots. Once received by the relay stations and endpoints, the downlink MAP may be used by the various components to determine the appropriate subchannel and time slot with which they are to either send or receive data.

Some of the steps illustrated in FIG. 4 may be combined, modified or deleted where appropriate, and additional steps may also be added to the flowchart. Additionally, steps may be performed in any suitable order without departing from the scope of the invention. For example, in particular embodiments slots may first be tentatively assigned to the relay links and then assigned to the first set of access links (for the endpoints connected to the transparent relay station).

While various implementations and features are discussed with respect to multiple embodiments, it should be understood that such implementations and features may be combined in various embodiments. For example, features and functionality discussed with respect to a particular figure, such as FIG. 2, may be used in connection with features and functionality discussed with respect to another such figure, such as FIG. 1, according to operational needs or desires.

Although particular embodiments have been described in detail, it should be understood that various other changes, substitutions, and alterations may be made hereto without departing from the spirit and scope of the present invention. For example, although an embodiment has been described with reference to a number of elements included within communication system 100 such as endpoints, base stations and relay stations, these elements may be combined, rearranged or positioned in order to accommodate particular routing architectures or needs. In addition, any of these elements may be provided as separate external components to communication system 100 or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for allocating resources in a wireless network, comprising:
    establishing one or more relay links between at least one base station and one or more relay stations;
    establishing one or more single-hop access links between one or more endpoints and the base station;
    establishing one or more multi-hop access links between one or more endpoints and the relay stations;
    iteratively repeating the following steps at the base station until a single-hop data rate is approximately equal to a multi-hop data rate:
        allocating a first number of slots to the multi-hop access links;
        dividing the first number of slots among the multi-hop access links ensuring each multi-hop access link comprises an approximately equal multi-hop data rate;
        allocating a second number of slots to the relay links ensuring that each relay link comprises a relay link data rate that is approximately equal to a collective multi-hop data rate for the respective multi-hop access links established therebetween;
        allocating a third number of slots to the single-hop access links;
        dividing the third number of slots among the single-hop access links ensuring each single-hop access link comprises an approximately equal single-hop data rate; and
        comparing the single-hop data rate to the multi-hop data rate; and
    upon the single-hop data rate being approximately equal to the multi-hop data rate, provisioning the first number of slots to each of the multi-hop access links, the second number of slots to each of the relay links, and the third number of slots to each of the single-hop access links.

2. The method of claim 1, wherein at least one of the relay stations comprises a transparent relay station.

3. The method of claim 1, further comprising collecting link quality information associated with at least one of the relay links, at least one of the single-hop access links, and at least one of multi-hop access links.

4. The method of claim 3 further comprising:
    determining the multi-hop data rate for each of the multi-hop access links using at least the link quality associated with each respective multi-hop access link and the number of slots divided to the respective multi-hop access link;
    determining the collective multi-hop data rate using the multi-hop data rate for each multi-hop access link;
    determining the single-hop data rate for each of the single-hop access links using at least the link quality associated with each respective single-hop access link and the number of slots divided to the respective single-hop access link; and
    determining the collective single-hop data rate using and the single-hop data rate for each single-hop access link.

5. The method of claim 1, wherein allocating the third number of slots comprises:
    determining a total number of slots available in a frame; and
    allocating the third number of slots based on the number of slots remaining from the total number of slots available after allocating the first number of slots to the multi-hop access links and the second number of slots to the s relay links.

6. The method of claim 1, further comprising transmitting a downlink MAP for a frame, the downlink MAP comprising information indicative of the provisioning, for the frame, of the first number of slots, the second number of slots, and the third number of slots.

7. The method of claim 6, wherein the method of claim 1 is repeated on a frame-by-frame basis before each transmission of a downlink MAP for a frame.

8. The method of claim 1, wherein:
    establishing one or more relay links comprises establishing at least one relay link between a first relay station and a second relay station; and
    allocating a second number of slots to the relay links further comprises ensuring that the relay link between the first relay station and the base station comprises a relay link data rate that is approximately equal to a collective multi-hop data rate for the respective multi-hop access links established therebetween and the at least one relay link between the first relay station and the second relay station.

9. An apparatus for allocating resources in a wireless network, comprising:
    an interface operable to:
        establish one or more relay links between at least one base station and one or more relay stations;
        establish one or more single-hop access links between one or more single-hop endpoints and the base station; and
        establish one or more multi-hop access links between one or more multi-hop endpoints and the relay stations; and
    a processor coupled to the interface wherein, until a single-hop data rate is approximately equal to a multi-hop data rate, the processor is iteratively operable to:
        allocate a first number of slots to the multi-hop access links;

divide the first number of slots among the multi-hop access links ensuring each multi-hop access link comprises an approximately equal multi-hop data rate;

allocate a second number of slots to the relay links ensuring that each relay link comprises a relay link data rate that is approximately equal to a collective multi-hop data rate for the respective multi-hop access links established therebetween;

allocate a third number of slots to the single-hop access links;

divide the third number of slots among the single-hop access links ensuring each single-hop access link comprises an approximately equal single-hop data rate; and compare the single-hop data rate to the multi-hop data rate; and wherein, upon the single-hop data rate being approximately equal to the multi-hop data rate, the processor is further operable to provision the first number of slots to each of the multi-hop access links, the second number of slots to each of the relay links, and the third number of slots to each of the single-hop access links.

10. The apparatus of claim 9, wherein at least one of the relay stations comprises a transparent relay station.

11. The apparatus of claim 9, wherein the interface is further operable to collect link quality information associated with at least one of the single-hop access links, at least one of the multi-hop links and at least one of the relay links.

12. The apparatus of claim 11, wherein the processor is further operable to:
determine the multi-hop data rate for each of the multi-hop access links using at least the link quality associated with each respective multi-hop access link and the number of slots divided to the respective multi-hop access link;
determine the collective multi-hop data rate using the multi-hop data rate for each multi-hop access link;
determining the single-hop data rate for each of the single-hop access links using at least the link quality associated with each respective single-hop access link and the number of slots divided to the respective single-hop access link; and
determine the collective single-hop data rate using and the single-hop data rate for each single-hop access link.

13. The apparatus of claim 9, wherein the processor operable to allocate the third number of slots is further operable to:
determine a total number of slots available in a frame; and
allocate the third number of slots based on the number of slots remaining from the total number of slots available after allocating the first number of slots to the multi-hop access links and the second number of slots to the relay links.

14. The apparatus of claim 9, wherein the interface is further operable to transmit a downlink MAP for a frame, the downlink MAP comprising information indicative of the provisioning, for the frame, of the first number of slots, the second number of slots, and the third number of slots.

15. The apparatus of claim 14, wherein the processor operable to provision the first, second and third number of slots is further operable to provision the first, second and third number of slots on a frame-by-frame basis before the interface transmits each downlink MAP for a frame.

16. The apparatus of claim 9, wherein:
the interface operable to establish one or more relay links comprises an interface operable to establish at least one relay link between a first relay station and a second relay station; and the processor operable to allocate a second number of slots to the relay links is further operable to ensure that a relay link between the first relay station and the base station comprises a relay link data rate that is approximately equal to a collective multi-hop data rate for the respective multi-hop access links established therebetween and the at least one relay link between the first relay station and the second relay station.

17. Logic encoded on non-transitory computer readable media comprising code that, when executed by a processor, is operable to:
establish one or more relay links between at least one base station and one or more relay stations;
establish one or more single-hop access links between one or more single-hop endpoints and the base station;
establish one or more multi-hop access links between one or more multi-hop endpoints and the relay stations;
iteratively repeat the following operations until a single-hop data rate is approximately equal to a multi-hop data rate:
allocate a first number of slots to the multi-hop access links;
divide the first number of slots among the multi-hop access links ensuring each multi-hop access link comprises an approximately equal multi-hop data rate;
allocate a second number of slots to the relay links ensuring that each relay link comprises a relay link data rate that is approximately equal to a collective multi-hop data rate for the respective multi-hop access links established therebetween;
allocate a third number of slots to the single-hop access links;
divide the third number of slots among the single-hop access links ensuring each single-hop access link comprises an approximately equal single-hop data rate; and
compare the single-hop data rate to the multi-hop data rate; and
upon the single-hop data rate being approximately equal to the multi-hop data rate, provision the first number of slots to each of the multi-hop access links, the second number of slots to each of the relay links, and the third number of slots to each of the single-hop access links.

18. The media of claim 17, wherein at least one of the relay stations comprises a transparent relay station.

19. The media of claim 17, wherein the code is further operable to collect link quality information associated with at least one of the single-hop access links, at least one of the multi-hop links and at least one of the relay links.

20. The media of claim 19 wherein the code is further operable to:
determine the multi-hop data rate for each of the multi-hop access links using at least the link quality associated with each respective multi-hop access link and the number of slots divided to the respective multi-hop access link;
determine the collective multi-hop data rate using the multi-hop data rate for each multi-hop access link;
determining the single-hop data rate for each of the single-hop access links using at least the link quality associated with each respective single-hop access link and the number of slots divided to the respective single-hop access link; and
determine the collective single-hop data rate using and the single-hop data rate for each single-hop access link.

21. The media of claim 17, wherein the code operable to allocate the third number of slots is further operable to:

determine a total number of slots available in a frame; and allocate the third number of slots based on the number of slots remaining from the total number of slots available after allocating the first number of slots to the multi-hop access links and the second number of slots to the relay links.

22. The media of claim 17, wherein the code is further operable to transmit a downlink MAP for a frame, the downlink MAP comprising information indicative of the provisioning, for the frame, of the first number of slots, the second number of slots, and the third number of slots.

23. The media of claim 22, wherein the code operable to provision the first, second and third number of slots is further operable to provision the first, second and third number of slots on a frame-by-frame basis before the transmission of the downlink MAP for each a frame.

24. The media of claim 17, wherein the code operable to:

establish one or more relay links is further operable to establishing at least one relay link between a first relay station and a second relay station; and allocate a second number of slots to the relay links is further operable to ensure that a relay link between the first relay station and the base station comprises a relay link data rate that is approximately equal to a collective multi-hop data rate for the respective multi-hop access links established therebetween and the at least one relay link between the first relay station and the second relay station.

* * * * *